(12) United States Patent
Hageman et al.

(10) Patent No.: US 6,668,551 B2
(45) Date of Patent: Dec. 30, 2003

(54) ACTUATOR HAVING COMMON BEARING

(75) Inventors: John B. Hageman, Vandalia, OH (US); Ernest R. Siler, Springboro, OH (US); Paul Rymoff, Bellbrook, OH (US); Ernst S. Baumgartner, Dayton, OH (US); Harald Klode, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 186 days.

(21) Appl. No.: 09/970,333

(22) Filed: Oct. 3, 2001

(65) Prior Publication Data

US 2003/0061933 A1 Apr. 3, 2003

(51) Int. Cl.[7] .................................................. F01B 9/00
(52) U.S. Cl. .............................................. 60/545; 303/3
(58) Field of Search .................... 60/545, 594; 403/309, 403/334, 358, 375, 380

(56) References Cited

U.S. PATENT DOCUMENTS

| | | | | |
|---|---|---|---|---|
| 5,236,257 A | * | 8/1993 | Monzaki et al. | 60/545 |
| 5,246,281 A | * | 9/1993 | Leppek | 60/545 |
| 5,788,341 A | * | 8/1998 | Penrod et al. | 303/3 |

* cited by examiner

Primary Examiner—Edward K. Look
Assistant Examiner—Igor Kershteyn
(74) Attorney, Agent, or Firm—Scott A. McBain

(57) ABSTRACT

An actuator assembly for a vehicle brake system or clutch pack comprises a motor shaft having a first tapered cutout, and a ballscrew shaft having a second tapered cutout. The first and second tapered cutouts being adapted to mate.

20 Claims, 2 Drawing Sheets

ACTUATOR HAVING COMMON BEARING

TECHNICAL FIELD

This invention relates to actuators for use in a motor vehicle brake system or to control torque to a driveline in a four wheel drive application.

BACKGROUND OF THE INVENTION

Vehicle braking systems, especially automotive braking systems, have typically been hydraulic-based. Hydraulic systems convert fluid pressure into linear and/or mechanical motion. Such systems allow the source of the hydraulic pressure to be positioned remotely from the cylinders that effect the braking action. These systems normally include an actuator, such as a brake pedal, reservoir fluid (such as in a master cylinder) which is responsive to pressure applied by the actuator, and means such as fluid cylinders for converting the hydraulic pressure to a braking force. Mechanical braking pressure is achieved by utilizing the force of the depression of the brake pedal by the driver to increase the pressure on the master cylinder. Such systems are typically accompanied by a vacuum boost that multiplies the force supplied to the brake pedal, throughout the braking operation. The increased pressure in the master cylinder is then transmitted through fluid lines to the fluid cylinders. The fluid cylinders operate calipers, thereby forcing the calipers and brake pads against the rotors and/or drums which slows the vehicle by frictional force.

Hydraulic systems of this type have several disadvantages. The master cylinder, vacuum booster, ABS modulator and hydraulic lines all take up space and add weight to the completed vehicle. Installation of standard hydraulic braking systems is also complicated and labor intensive. Additionally, the large number of parts and installation also adds to repair and maintenance issues as individual parts reach the end of their useful life.

A variant form of applying a vehicle brake system is referred to as a brake by wire (BBW) system. BBW describes the ability to activate vehicle wheel brakes via an electric signal generated by an onboard processor/controller as a result of input signals thereto. Brake torque is applied to the wheels without direct mechanical interaction between the vehicle's brake pedal and the wheel brake.

A particular type of BBW systems is known as a "dry interface corner" (DIC) system. The DIC system is known as a hybrid system, in that electric signals are used to generate the type and amount of braking force required at each wheel of the vehicle with electrical wires rather than standard hydraulic brake lines. The typical DIC system operates when a driver inputs a force to the brake pedal. A force sensor and travel sensor attached to the pedal transmits an electronic signal to an electronic controller, which in turn sends the signal to a self-contained braking module typically located at each wheel of the vehicle. The self-contained braking module takes the electrical signal and mechanically brakes the vehicle. The self-contained module utilizes an individual motor that drives a ball screw piston assembly, which in turn pressurizes hydraulic brake fluid to ultimately apply the brake caliper to a rotor at that corner of the vehicle. Such a DIC system significantly reduces assembly cost. The individual modules can be separately assembled and fluid filled prior to the manufacture of the vehicle. DIC modules then only need to be bolted to the automobile during the assembly process and plugged in using standard electrical connections. Thus, reliability and quality control of the overall brake system is also increased. Finally, the elimination of hydraulic lines stretching throughout the vehicle as well as the elimination of the master cylinder, booster, and ABS modulator reduces space requirements within the engine compartment.

A DIC brake actuator normally has a fluid reservoir that is used to compensate for long term brake lining wear. Acuators of this type are described in patent application Ser. Nos. 09/769,644, and 09/792,727, both of which are assigned to the assignee of the present invention and hereby incorporated by reference. When the actuator in these systems is at a released position, the reservoir communicates to a bore of the actuator through a bypass hole or a normally open solenoid. When the actuator piston is applied, no fluid is displaced until the bypass hole is covered by a seal of the actuator piston, or until the solenoid is moved into the closed position.

SUMMARY OF THE INVENTION

The present invention is an actuator assembly comprising a motor shaft and a ballscrew shaft. The motor shaft has a first tapered cutout, and the ballscrew shaft has a second tapered cutout. The first and second tapered cutouts are adapted to mate.

This design allows the use of a single bearing assembly around the tapered cutouts, and is more efficient than prior art designs because it eliminates the material and labor costs of an additional bearing assembly. The present invention also reduces package size and mass, and simplifies assembly of the motor and actuator. Additionally, in embodiments where the shafts are press fit through an inner bearing race, much of the runout of the shafts is eliminated.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
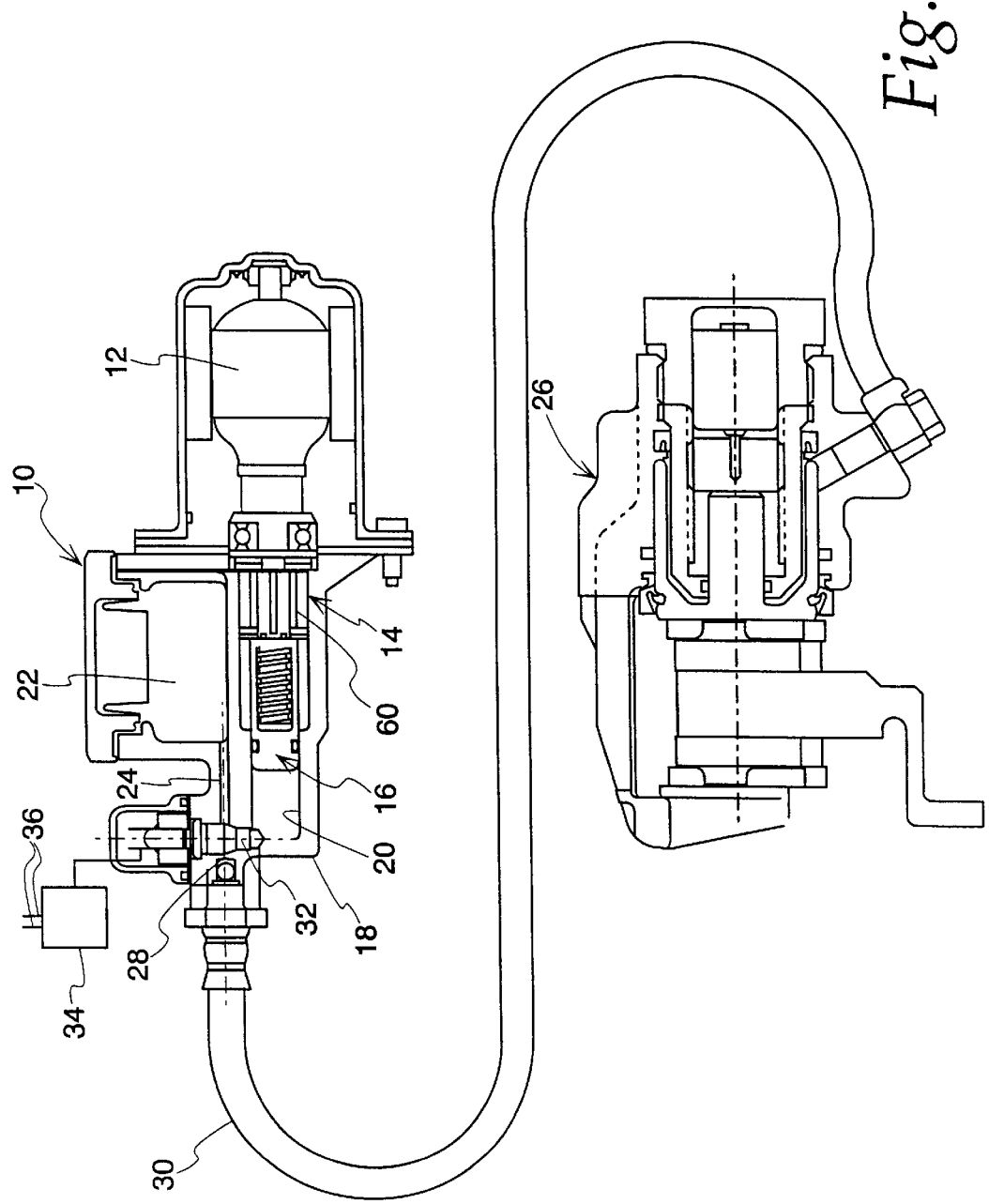
FIG. 1 shows an actuator assembly according to the present invention for use with a vehicle wheel brake assembly.

The Dry Interface Corner (DIC) brake system shown in FIG. 1 includes an independent hydraulic actuator assembly 10 for each wheel brake assembly. The actuator assembly 10 includes a motor having an armature assembly 12 that drives a ballscrew assembly 14. In turn, the ballscrew assembly 14 applies and releases a hydraulic piston 16 in an actuator body 18. The actuator body 18 includes a bore 20 that communicates with a brake fluid reservoir 22 through a channel 24. The actuator assembly 10 is in hydraulic communication with the wheel brake assembly 26 through a bore outlet 28 and a brake pipe or hose 30. When the actuator assembly 10 is at the brake-released position, the brake fluid path between the wheel brake and the actuator fluid reservoir 22 is open. This allows brake fluid to flow to and from the fluid reservoir 22 due to brake fluid expansion and contraction as a result of temperature change and brake fluid compensation due to brake lining wear.

A solenoid 32 is situated in the end of the actuator bore 20 proximate the bore outlet 28. The solenoid 32 is normally open, allowing fluid communication and compensation between the actuator reservoir 22 and the bore 20. At the onset of brake apply, a controller 34 closes the solenoid 32 and isolates the reservoir 22 from the rest of the brake system until the vehicle operator releases the brake pedal. The inputs 36 to control the solenoid 32 are preferably the same switches and sensors used to respond to driver input to initiate braking. Because the time required to activate the solenoid 32 is less than the time needed to initiate motion of the piston 16 and thereby initiate braking, there is no displacement loss at the beginning of a brake event, and response time is improved.

Figure 2:
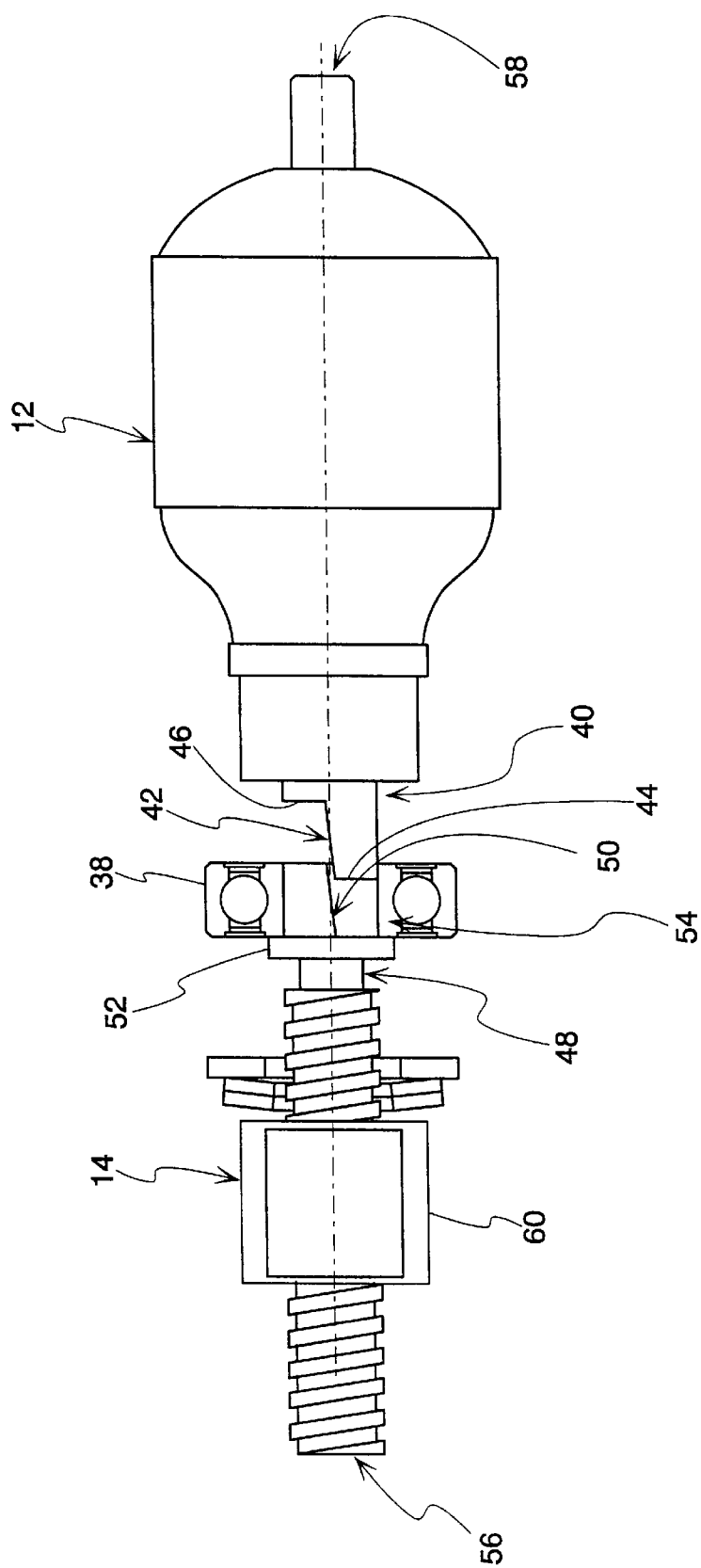
FIG. 2 shows a portion of the actuator assembly during assembly.

As best shown in FIG. 2, the armature assembly 12 and the ballscrew assembly 14 are separate components, and are joined at a ball bearing assembly 38. A motor shaft 40 of the armature assembly 12 has a tapered cutout 42 at its output end. The tapered cutout 42 extends from an end 44 of the shaft 40 to a shoulder 46, and in a preferred embodiment forms an angle of about five degrees with the centerline of the motor shaft 40. The tapered cutout 42 intersects the centerline of the motor shaft 40 slightly closer to the end 44 than to the shoulder 46, such that the distance from the intersection to the shoulder is about 0.25 millimeters longer than the distance from the intersection to the end 44.

The end of ballscrew shaft 48 is a mirror image of the motor shaft 40, and has a corresponding tapered cutout 50. A shoulder 52 of the ballscrew shaft 48 also serves as an abutment surface for an inner race 54 of the ball bearing assembly 38. To assemble the actuator 10, the ballscrew assembly 14 is first installed vertically in a fixture and rested on an end surface 56 of the ballscrew shaft 48. Next, the ball bearing assembly 38 is placed in position with the inner race 54 located against the ballscrew shaft shoulder 52. The tapered cutout 42 in motor shaft 40 is then guided into the mating cutout 50 of the ballscrew shaft 48. The tapers are such that the assemblies 12 and 14 initially guide together easily. When a predetermined load is thereafter applied on surface 58 of motor shaft 40, the inside diameter of bearing assembly inner race 54 and the diameter created by the intersection points of the two shafts 40 and 48 result in a typical interference press fit.

The armature assembly 12 and the ballscrew assembly 14 are thus permanently joined and piloted through the press fit to the inside diameter of the inner race 54 of the ball bearing assembly 38, as shown in FIG. 1. The single bearing assembly 38 pilots both the armature assembly 12 and the ballscrew assembly 14, and provides a reaction method for opposing the axial piston load which is applied through a ballnut 60 to the ballscrew shaft 48, to the shoulder 52, and into the bearing assembly 38. While FIG. 1 shows the reaction system to be a brake caliper, it should be appreciated that the present invention also contemplates that the reaction system is a clutch pack assembly of a motor vehicle transfer case and the fluid medium is transmission fluid rather than brake fluid. Operation and control of the actuator is the same in either application.

The present invention thus uses a single bearing assembly, as opposed to prior art designs which use separate bearing assemblies on each end of the armature shaft. The present invention also reduces package size and mass, and simplifies assembly of the motor and actuator.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An actuator assembly comprising:
   a motor shaft having a first tapered cutout; and
   a ballscrew shaft having a second tapered cutout, the first and second tapered cutouts being adapted to mate.

2. The actuator assembly of claim 1 wherein the first tapered cutout is generally planar.

3. The actuator assembly of claim 2 wherein the motor shaft has a centerline, and the first tapered cutout is angled with respect to the motor shaft centerline.

4. The actuator assembly of claim 3 wherein the first tapered cutout is angled with respect to the motor shaft centerline at about five degrees.

5. The actuator assembly of claim 1 wherein the motor shaft has a centerline, and the first tapered cutout intersects the motor shaft centerline.

6. The actuator assembly of claim 1 wherein the second tapered cutout is generally planar.

7. The actuator assembly of claim 6 wherein the ballscrew shaft has a centerline, and the second tapered cutout is angled with respect to the ballscrew shaft centerline.

8. The actuator assembly of claim 7 wherein the second tapered cutout is angled with respect to the ballscrew shaft centerline at about five degrees.

9. The actuator assembly of claim 1 wherein the ballscrew shaft has a centerline, and the second tapered cutout intersects the ballscrew shaft centerline.

10. The actuator assembly of claim 1 further comprising a ball bearing assembly disposed around the first and second tapered cutouts.

11. An actuator assembly comprising:
    a piston disposed in a bore, the bore being in communication with a fluid source;
    a motor shaft having a first tapered cutout; and
    a ballscrew shaft connected to the piston, the ballscrew shaft having a second tapered cutout adapted to mate with the first tapered cutout.

12. The actuator assembly of claim 11 wherein the first tapered cutout is generally planar.

13. The actuator assembly of claim 12 wherein the motor shaft has a centerline, and the first tapered cutout is angled with respect to the motor shaft centerline.

14. The actuator assembly of claim 13 wherein the first tapered cutout is angled with respect to the motor shaft centerline at about five degrees.

15. The actuator assembly of claim 11 wherein the motor shaft has a centerline, and the first tapered cutout intersects the motor shaft centerline.

16. The actuator assembly of claim 11 wherein the second tapered cutout is generally planar.

17. The actuator assembly of claim 16 wherein the ballscrew shaft has a centerline, and the second tapered cutout is angled with respect to the ballscrew shaft centerline at about five degrees.

18. The actuator assembly of claim 11 wherein the ballscrew shaft has a centerline, and the second tapered cutout intersects the ballscrew shaft centerline.

19. The actuator assembly of claim 11 further comprising a ball bearing assembly disposed around the first and second tapered cutouts.

20. An actuator assembly for a vehicle brake system or clutch pack, the actuator assembly comprising:

a motor shaft having a first, generally planar tapered cutout;

a ballscrew shaft having a second, generally planar tapered cutout mating with the first tapered cutout; and a ball bearing assembly disposed around the first and second tapered cutouts.

* * * * *